(12) United States Patent
Tomita

(10) Patent No.: US 8,364,387 B2
(45) Date of Patent: Jan. 29, 2013

(54) ROUTE SEARCH DEVICE AND INFORMATION CONTROL SERVER

(75) Inventor: Daisuke Tomita, Nagoya (JP)

(73) Assignee: DENSO CORPORATION, Kariya (JP)

( * ) Notice: Subject to any disclaimer, the term of this patent is extended or adjusted under 35 U.S.C. 154(b) by 606 days.

(21) Appl. No.: 12/588,743

(22) Filed: Oct. 27, 2009

(65) Prior Publication Data

US 2010/0114466 A1    May 6, 2010

(30) Foreign Application Priority Data

Oct. 30, 2008 (JP) ................................ 2008-279257

(51) Int. Cl.
- G06G 7/70 (2006.01)
- G01C 21/00 (2006.01)
- G08G 1/123 (2006.01)
- G01S 19/40 (2010.01)
- G01S 19/07 (2010.01)

(52) U.S. Cl. ........ 701/118; 701/117; 701/400; 701/409; 701/410; 701/411; 701/412; 701/413; 701/414; 701/420; 701/421; 340/995.13; 340/995.17; 340/995.19; 342/357.23; 342/357.44

(58) Field of Classification Search ............... 701/117, 701/118, 200, 409–414, 420, 421; 340/995.1–995.13; 342/357.23, 357.44
See application file for complete search history.

(56) References Cited

U.S. PATENT DOCUMENTS

| | | | |
|---|---|---|---|
| 6,680,694 B1 * | 1/2004 | Knockeart et al. | 342/357.31 |
| 6,968,272 B2 * | 11/2005 | Knockeart et al. | 701/414 |
| 7,136,744 B2 * | 11/2006 | Maeda | 701/411 |
| 7,248,947 B2 * | 7/2007 | Sasaki et al. | 701/1 |
| 2004/0196163 A1 * | 10/2004 | Takenaga et al. | 340/995.12 |
| 2004/0225437 A1 * | 11/2004 | Endo et al. | 701/209 |
| 2005/0071081 A1 * | 3/2005 | Hirose et al. | 701/210 |
| 2005/0140524 A1 * | 6/2005 | Kato et al. | 340/995.13 |
| 2007/0203685 A1 | 8/2007 | Takano | |

FOREIGN PATENT DOCUMENTS

EP    1 840 519 A2    10/2007
(Continued)

OTHER PUBLICATIONS

Notice of Reasons for Refusal mailed on Feb. 8, 2011 from the Japanese Patent Office in the corresponding Japanese patent application No. 2008-279257 (and English translation).
Korean Office Action mailed on Feb. 15, 2011 from the Korean Intellectual Property Office in the corresponding Korean patent application No. 10-2009-0104644 (and English translation).

(Continued)

Primary Examiner — James Trammell
Assistant Examiner — Majdi Alsomiri
(74) Attorney, Agent, or Firm — Posz Law Group, PLC

(57) ABSTRACT

A route search device includes: a parameter calculator for calculating a parameter of each section in a route; a driving repetition information obtaining element for obtaining driving repetition information in each section from an external server; a parameter changing element for increasing a parameter of first one of the sections when a driving repetition of the first one of the sections is smaller than a first parameter threshold; and a route search element for searching the route to minimize a total of parameters of the sections in the route.

9 Claims, 6 Drawing Sheets

FOREIGN PATENT DOCUMENTS

| | | |
|---|---|---|
| JP | A-2000-046575 | 2/2000 |
| JP | A-2002-181574 | 6/2002 |
| JP | A-2004-029871 | 1/2004 |
| JP | A-2004-333377 | 11/2004 |
| JP | A-2005-182415 | 7/2005 |
| JP | A-2005-284588 | 10/2005 |
| JP | A-2006-029863 | 2/2006 |
| JP | A-2006-293876 | 10/2006 |

OTHER PUBLICATIONS

Final Office Action mailed Oct. 24, 2011 in corresponding Korean application No. 10-2009-0104644 (and English translation).

Second Office Action dated Oct. 19, 2012 in corresponding CN Application No. 20091020936.X (and English translation).

* cited by examiner

ROUTE SEARCH DEVICE AND INFORMATION CONTROL SERVER

CROSS REFERENCE TO RELATED APPLICATION

This application is based on Japanese Patent Application No. 2008-279257 filed on Oct. 30, 2008, the disclosure of which is incorporated herein by reference.

FIELD OF THE INVENTION

The present invention relates to a route search device for searching an optimum route from a starting point to a destination, and an information control server for route search.

BACKGROUND OF THE INVENTION

JP-2004-29871 teaches a traffic information system including an information center and an in-vehicle device. The information center estimates and analyzes a traffic condition based on traffic information transmitted from a probe vehicle. The probe vehicle as an information gathering, vehicle collects the traffic information regarding a road, on which the probe vehicle runs. The in-vehicle device displays the traffic condition on a display device based on the traffic information transmitted from the information center.

In the above system, the traffic information regarding only the road, on which the probe vehicle actually drives, is gathered in the center. The center estimates the traffic condition about the road based on the gathered traffic information, and distributes the estimated traffic condition.

Accordingly, regarding a section of a road, on which the probe vehicle does not run, or the probe vehicle seldom runs, the center cannot estimate the traffic condition of the section of the road with high accuracy. Accordingly, when the in-vehicle device searches an optimum route so, as to avoid a traffic jam based on the traffic condition distributed from the center, the optimum route may include the section of the road, on which the probe vehicle does not run, or the probe vehicle seldom runs. In this case, the in-vehicle device guides the optimum route including the section of the road, on which the probe vehicle does not run, or the probe vehicle seldom runs.

Thus, it is required for in-vehicle device to search the optimum route not including the section of the road, on which the probe vehicle does not run, or the probe vehicle seldom runs.

SUMMARY OF THE INVENTION

In view of the above-described problem, it is an object of the present disclosure to provide a route search device for searching an optimum route from a starting point to a destination, and an information control server for route search.

According to a first aspect of the present disclosure, a route search device searches a route from a starting point to a destination, the route including a plurality of sections. The device includes: a parameter calculator for calculating a parameter of each section in the route based on road information in a map data; a driving repetition information obtaining element for obtaining driving repetition information in each section from an external server, wherein the server calculates a driving repetition of vehicles in each section based on traffic information when the server receives the traffic information from vehicles for collecting the traffic information regarding a road; a parameter changing element for increasing a parameter of first one of the sections when the driving repetition of the first one of the sections is smaller than a first parameter threshold, wherein the driving repetition of the first one of the sections is determined based on the driving repetition information; and a route search element for searching the route to minimize a total of parameters of the sections in the route.

The above device can search the route without including a section, through which a vehicle cannot pass, and a section, through which the vehicle seldom passes.

According to a second aspect of the present disclosure, an information control server includes: a communication element for communicating a probe vehicle, which collects traffic information regarding a road; a driving repetition information memory for calculating a driving repetition in a predetermined section based on the traffic information when the server receives the traffic information from the probe vehicle, and for storing driving repetition information, which represents the driving repetition in the section; and a driving repetition information transmitting element for extracting the driving repetition of the section from the driving repetition information memory when a route search device in another vehicle requests the driving repletion of the section, and for transmitting the driving repletion of the section to the route search device in the other vehicle.

The above server provides to increase a parameter for evaluating an optimum route when the driving repetition of the section is smaller than a predetermined value. Based on the parameter, the route is searched to minimize a total of parameters in the sections in the route.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
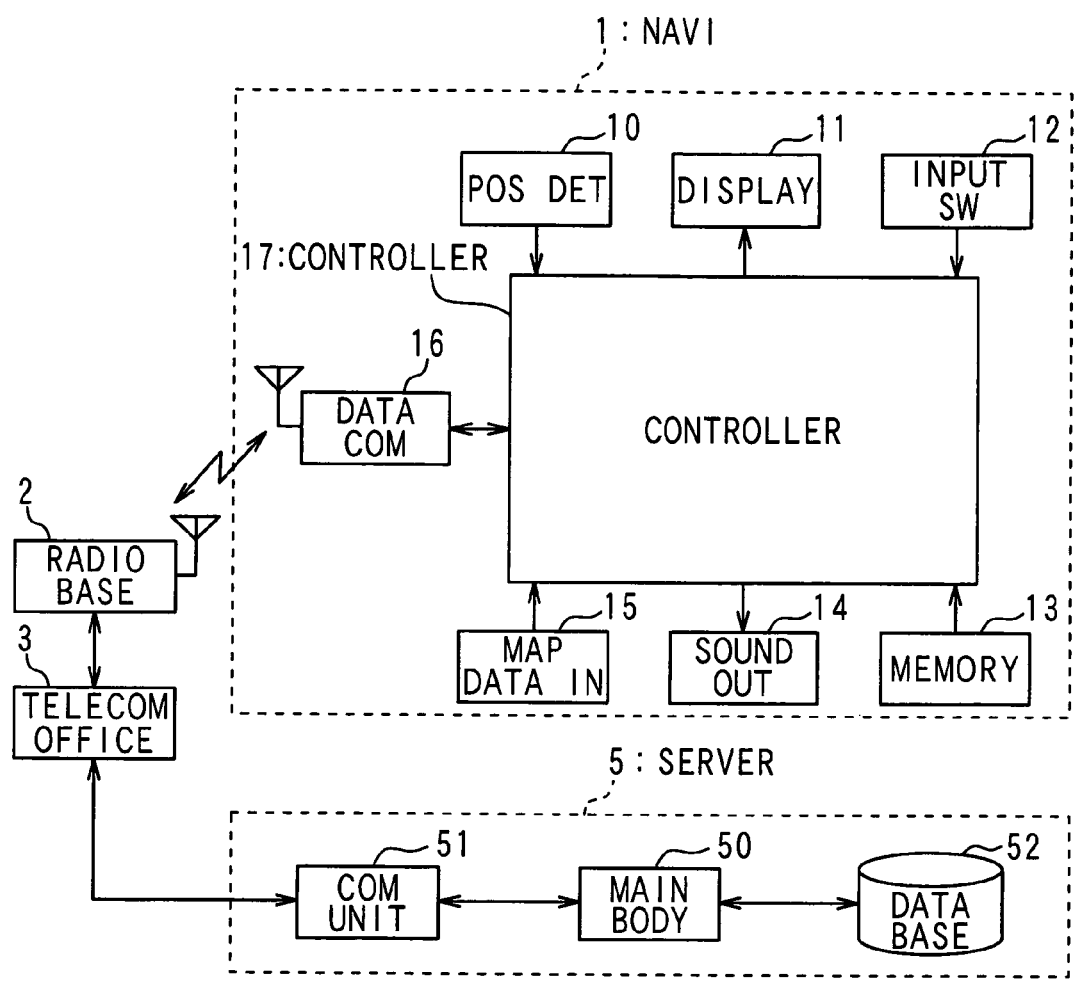
FIG. 1 is a diagram showing a route search device and an information control server.

A route search device and an information control server according to an example embodiment are shown in FIG. 1. The route search device is provided by a navigation device 1, which is mounted on a vehicle. The navigation device 1 communicates with the information control server 5 in an information center via a network including a radio base station 2, a telecommunication office 3 and the like.

The vehicle including the navigation device 1 as an in-vehicle device functions as a probe vehicle. Thus, the navigation device 1 gathers and collects traffic information as probe information regarding a road, on which the vehicle runs. The navigation device 1 transmits the gathered traffic information to the information control server 5.

The navigation device 1 includes a position detector 10, a display element 11, an input switch 12, a memory 13, a sound output element 14, a map data input element 15, a data communication element 16 and a controller 17.

The position detector 10 includes a conventional geomagnetic sensor, a gyroscope, a distance sensor, a GPS receiver and the like. The position detector 10 outputs information to the controller 17, the information for specifying a current position and a driving direction of the vehicle based on detection signals from the sensors.

The display element 11 includes a liquid crystal display, and controls the display to display an image corresponding to an image signal input from the controller 17.

The input switch 12 includes a touch switch, a mechanical switch and the like. The touch switch is mounted on the display of the display element 11, and the mechanical switch is arranged around the display of the display element 11. The input switch 12 outputs a signal to the controller 17, the signal corresponding to switch operation of a user of the device 1.

The memory 13 includes a ROM, a RAM a Flash memory and the like. The ROM stores a program executed by the controller 17.

The sound output element 14 includes a speaker for outputting sound and/or a voice message. The sound output element 14 outputs the sound corresponding to a sound signal to be inputted from the controller 17.

The map data input element 15 inputs the map data from a map data memory medium (not shown), which stores the map data. The map data includes a distance between two links, a type of a road, the number of traffic lanes, traffic control information such as one way traffic, traffic information such as a position of a traffic signal, a map matching data for improving a detection accuracy of a current position, a landscape data such as a position, a shape and a name of a river, a lake, a sea, a railroad and a facility, and a facility data such as a name, a location and a type of a facility in each area. The map data memory medium is a CD=ROM, a DVD-ROM, a hard disk drive, a memory card or the like.

The data communication element 16 includes a DCM (data communication module) and a cell phone. The data communication element 16 interactively communicates with an external system by air.

The controller 17 is a computer having a CPU, a I/O device and the like. The controller 17 executes various process according to a program stored in the ROM of the memory 13. The process in the controller 17 is, for example, a current position determination process for specifying a current position and a driving direction of a vehicle based on information input from the position detector 10, a map display process for displaying a current position mark of the vehicle on a map around the vehicle, a route search process for searching an optimum route from, a starting point to a destination with using the Dijkstra method or the like, and a route guiding process for guiding a searched route.

The information control server 5 includes a server main body 50, a communication unit 51 and a database 52.

The main body 50 is a computer having a CPU, a memory, a hard disk drive, and an I/O device. The CPU executes various process according to a program stored in the hard disk drive.

The communication element 51 interactively communicates with an external system via a network having a radio base station 2, a telecommunication office 3 and the like.

The navigation device 1 as an in-vehicle device is mounted on a probe vehicle, and collects traffic information regarding a road, on which the vehicle has ran, and transmits the traffic information to the server 5. When the server 5 receives the traffic information from the in-vehicle device, the server 5 calculates a repetition rate of driving in each section such as a link with using the traffic information received from the vehicle. The server 5 stores and/or updates calculated driving repetition information in the data base 52.

Figure 2:
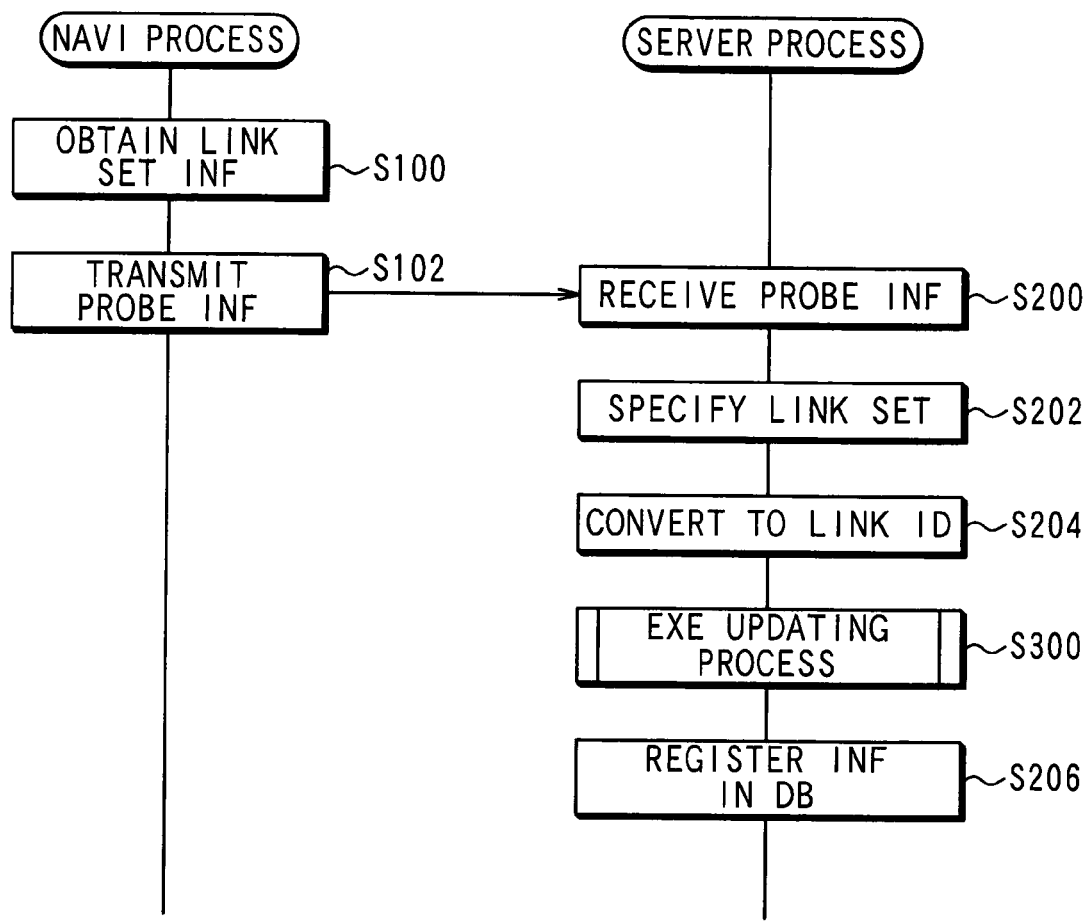
FIG. 2 is a diagram showing a sequence for memorizing and updating driving repetition information based on road information.

FIG. 2 shows a sequence control program for the navigation device 1 and the server 5. The process in each of the in-vehicle device 1 and the server 5 will be explained as follows. The in-vehicle device 1 and the server 5 are in operation state.

First, the in-vehicle device 1 obtains driving link information in Step S100. Specifically, the device 1 reads out the map data around the vehicle from the map data input element 15, and obtains the driving link information indicating a road, i.e., a link, on which the vehicle has ran. Further, the device 1 collects information such as an average vehicle speed in each link, a traveling time in each link (i.e., a link traveling time) and a driving direction of the vehicle.

When the device 1 prepares the probe information such as the driving link information and the information such as the average vehicle speed, the device 1 transmits the probe information to the server 5 in Step S102. Specifically, at every predetermined time interval, or every predetermined driving distance, the device 1 transmits the probe information to the server 5, the probe information including the average vehicle speed in each link, the traveling time in each link, date information, position information such as latitude and longitude information, the driving direction and the link information showing the driving link.

The in-vehicle device 1 repeats Steps S100 and S102, so that the traffic information regarding the driving road is transmitted to the server 5 each moment. The server 5 receives the probe information from multiple vehicles as probe vehicles.

When the server 5 receives the probe information from each probe vehicle in Step S200, the server 5 specifies the driving link set indicating one or more links, on which the vehicle transmitting the probe information has ran, based on the link set information in the probe information in Step S202.

Next, in Step S204, the server 5 converts the driving link set to an infra link ID, which is recognizable for the server 5. Then, in Step S300, the server 5 executes an information updating process for a repetition rate of driving.

Figure 3:
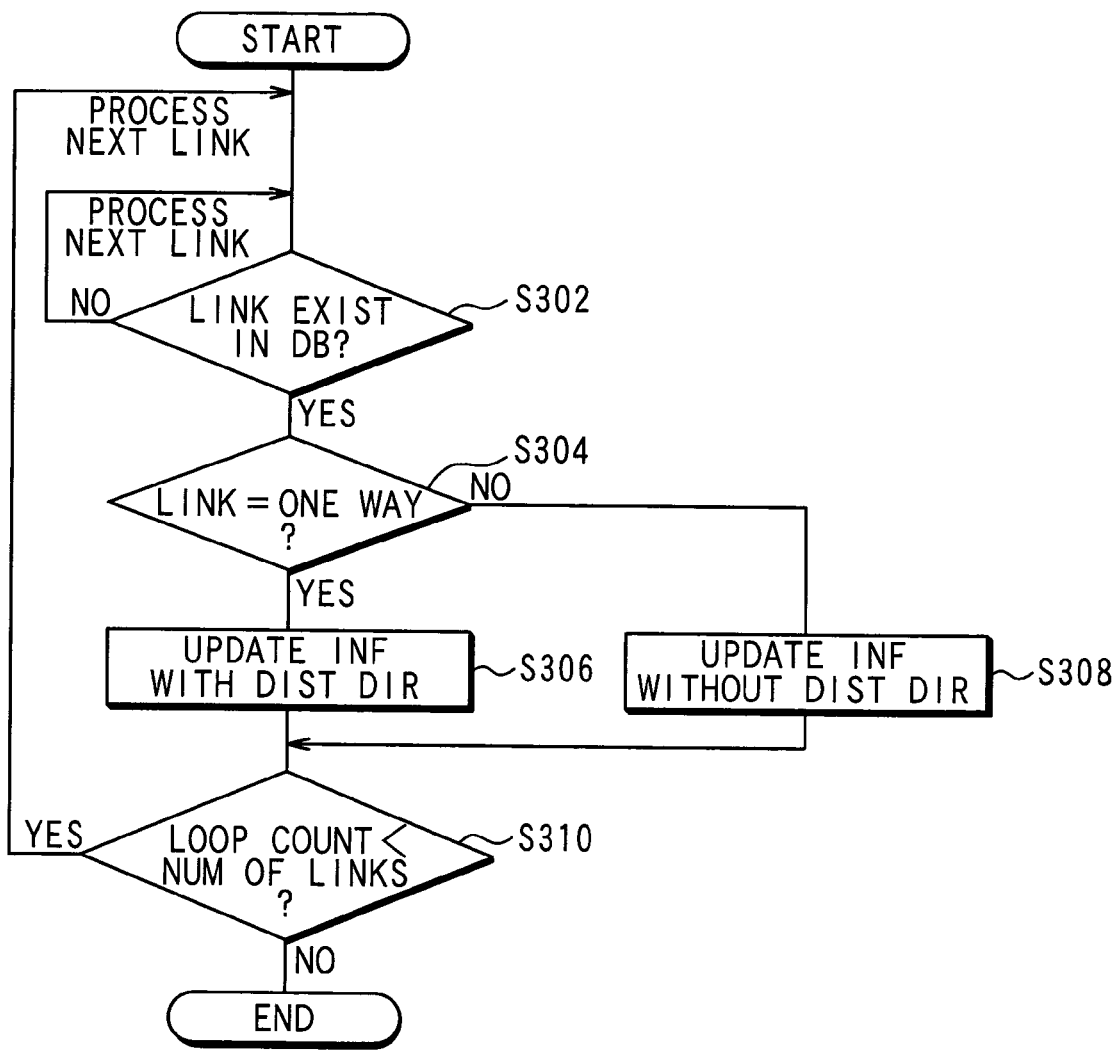
FIG. 3 is a flow chart showing a driving repetition information updating process.

FIG. 3 shows a flowchart of the updating process for the repetition rate of driving. The server 5 periodically executes the updating process.

The server 5 executes a loop process from Step S302 to S308 with respect to each link, which is obtained from the navigation device 1. Thus, multiple loop process corresponding to all links are executed.

First, in Step S302, the server 5 determines whether the link obtained from the device 1 exists in the database 52. Specifically, the server 5 determines whether the driving link as a process object exists in the database 52.

When the link does not exists in the database 52, the determination in Step S302 is "NO," and thereby, it returns to Step S302 so that the server 5 processes the next link.

When the link exists in the database 52, the determination in Step S302 is "YES," and it proceeds to Step S304. In Step S304, the server 5 determines whether the link corresponds to a one way. Specifically, the server 5 determines whether the link indicating the road corresponds to the one way road. The determination of the one way is performed based on existence of traffic control of one way with reference to the road information in the map data.

When the link corresponds to the one way road, the determination in Step S304 is "YES." Then, in Step S306, the server 5 distinguishes the driving direction, and updates the repetition information. In the present embodiment, the number of vehicles running in each link in a current predetermined period is calculated. Then, the number of driving vehicles as repetition information is stored and updated in the database 52. Here, the number of driving vehicles in each link is stored and updated in the database 52 with distinguishing the driving direction.

When the link as a processing object is not one way, the determination in Step S304 is "NO." In this case, without distinguishing the driving direction, the repetition information is updated in Step S308.

In Step S310, the server 5 determines whether the loop count is smaller than the number of links. Here, the loop count means the repeat count of Steps S302 to S308. When the loop count is smaller than the number of links, to goes to Step S302 so that the server 5 processes the next link.

When the loop count is equal to or larger than the number of links, the process ends. The above process is performed with respect to all driving link set, which is obtained from the in-vehicle device 1. When the process with respect to all driving link set end, the driving repetition information updating process ends.

After the driving repetition information updating process ends, the server executes Step S206 in FIG. 2. In Step S206, the traffic information regarding the driving link is registered in the database 52. Specifically, according to the average speed of each link, the driving time in each link (i.e., the link traveling time), the date information, the position information (the latitude and longitude information), the driving direction (i.e., the traveling direction) and the link set information, which are included in the traffic information, the traffic information regarding the traveled link is stored in the database 52. Further, the traffic flow is determined based on the average speed in each link. Then, the traffic jam information showing the traffic flow such as traffic jam, congested traffic or smooth flow of traffic is also registered.

According to the above sequence, the process in the in-vehicle device 1 and the process in the server 5 are repeated, so that the traffic information, the driving repetition information and the traffic jam information regarding the driving road are stored and updated in the database 52.

When the navigation device 1 searches the route from the starting pint to the destination, the device 1 transmits the route information showing the searched route based on the road information in the map data to the server 5. The device 1 receives the driving repetition information and the traffic jam information in a certain range including the searched route from the server 5. Based on the driving repetition information and the traffic jam information, the device 1 searches the optimum route from the starting point to the destination again.

Figure 4:
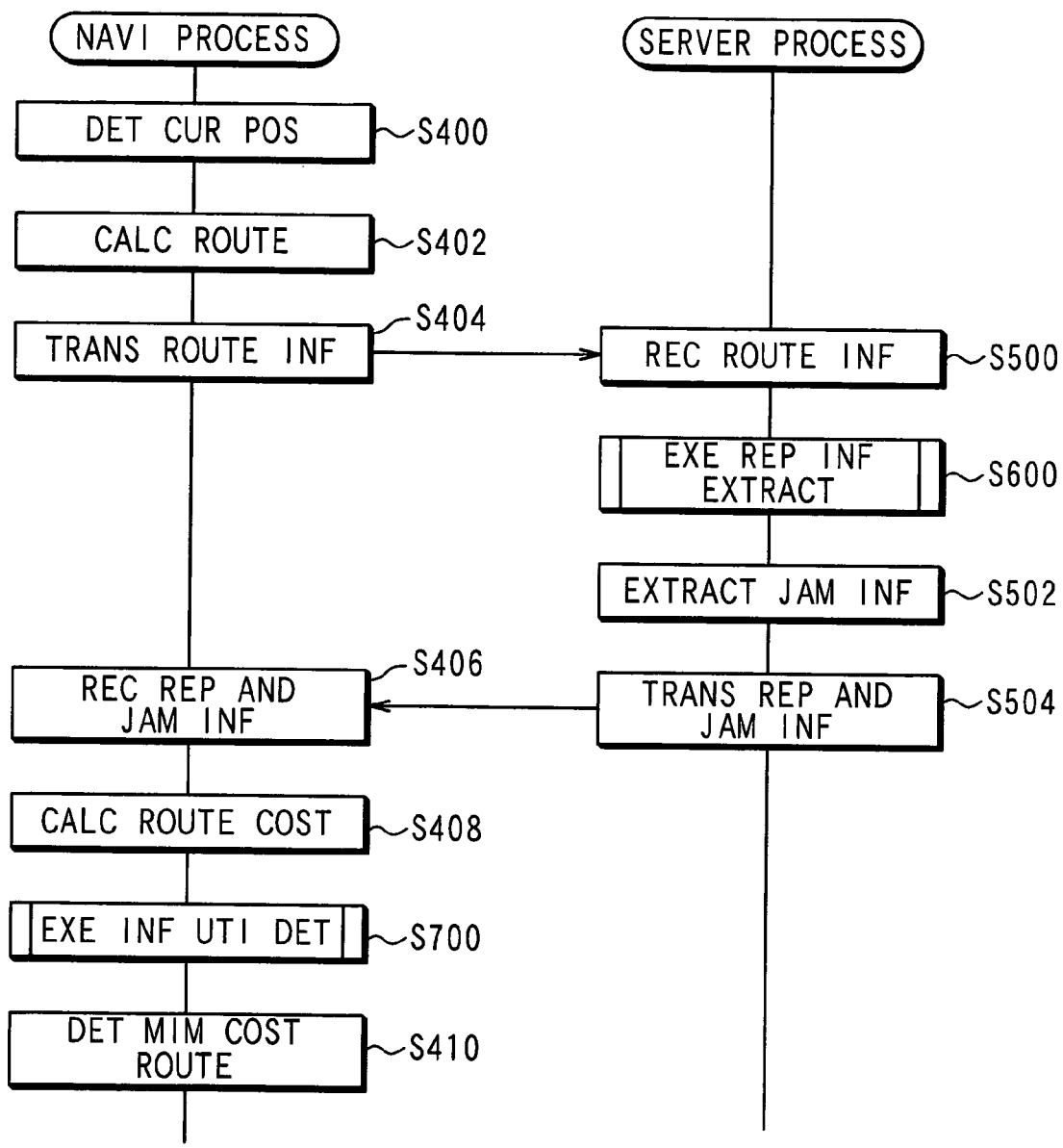
FIG. 4 is a diagram showing a sequence for searching a route with using the driving repetition information.

FIG. 4 shows a sequence between the process in the navigation device 1 and the process in the server 5. Here, the device 1 and the server 5 are in the operation state.

The device 1 specifies the current position of the vehicle in Step S400. The current position is determined based on the current position determination process.

Then, in Step S402, the route calculation step is performed. Specifically, the device 1 determines the starting point and the current position according to user operation. Further, based on the road information in the map data, the driving cost of a route in each predetermined section is calculated, and an optimum route that provides the minimum driving cost (i.e., the route cost) from the starting poinyt to the destination is searched. Here, when the user does not input the starting point, the current position specified in step S400 is determined as the starting point. In the present embodiment, calculation of the route cost is performed by adding the driving cost (the link cost) in each link and the driving cost (the node cost) at each node. For example, the link cost is calculated by the formula of "(Link cost)=(Link length)×(Road width factor)×(Road type factor)×(Number of traffic signals)." The node cost is calculated by, for example, the formula of "(Node cost)=(Right turn factor)×(Number of right turns)+(Left turn factor)×(Number of left turns)."

Next, in Step S404, the route information showing the searched route in Step S402 is transmitted to the server 5. Here, the route information includes the link set showing the starting point, the destination and the route from the starting point to the destination.

The server 5 receives the route information in Step S500. Then, the sever 5 performs the driving repetition information extraction process in Step S600.

Figure 5:
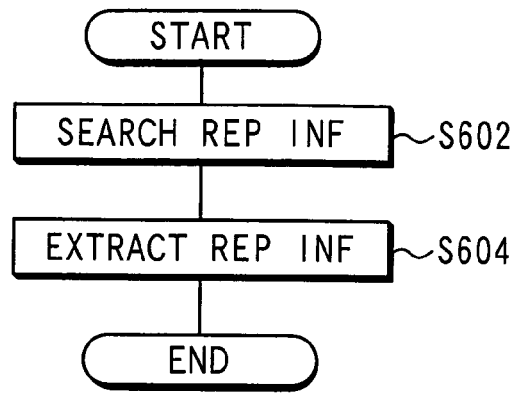
FIG. 5 is a diagram showing a flowchart of a driving repletion information extraction process.

FIG. 5 shows the driving repetition information extraction process. In Step S602 of the extraction process, based on the starting point, the destination and the link set in the route information, the driving repetition information in a certain area including the route from the starting point to the destination is searched from the data base 52. Here, the server 5 searches only the driving repetition information registered in the data base 52 for the last predetermined period of time, for example, for the last one month.

Next, in Step S604, the searched driving repetition information is extracted as the information to be transmitted to the device 1, which has transmitted the route information. Then, the process ends.

In Step S502 of FIG. 4, the server 5 extracts the traffic jam information. Specifically, similar to Step S602, the server 5 searches the traffic jam information in a certain range including the route from the starting point to the destination.

Next, in Step S504, the driving repetition information and the traffic jam information are transmitted to the device 1, which has transmitted the route information.

The device 1 receives the repetition information and the traffic jam information from the server 5 in Step S406. Then, the device 1 calculates the route cost in each section based on the road information in the map data in Step S408. Specifically, based on the road information in the map data, the device 1 calculates the driving cost in each section with respect to all of links, in the certain area including the route from the starting point to the destination. Then, the device 1 executes the driving repetition and traffic jam information utilization determination process in Step S700.

Figure 6:
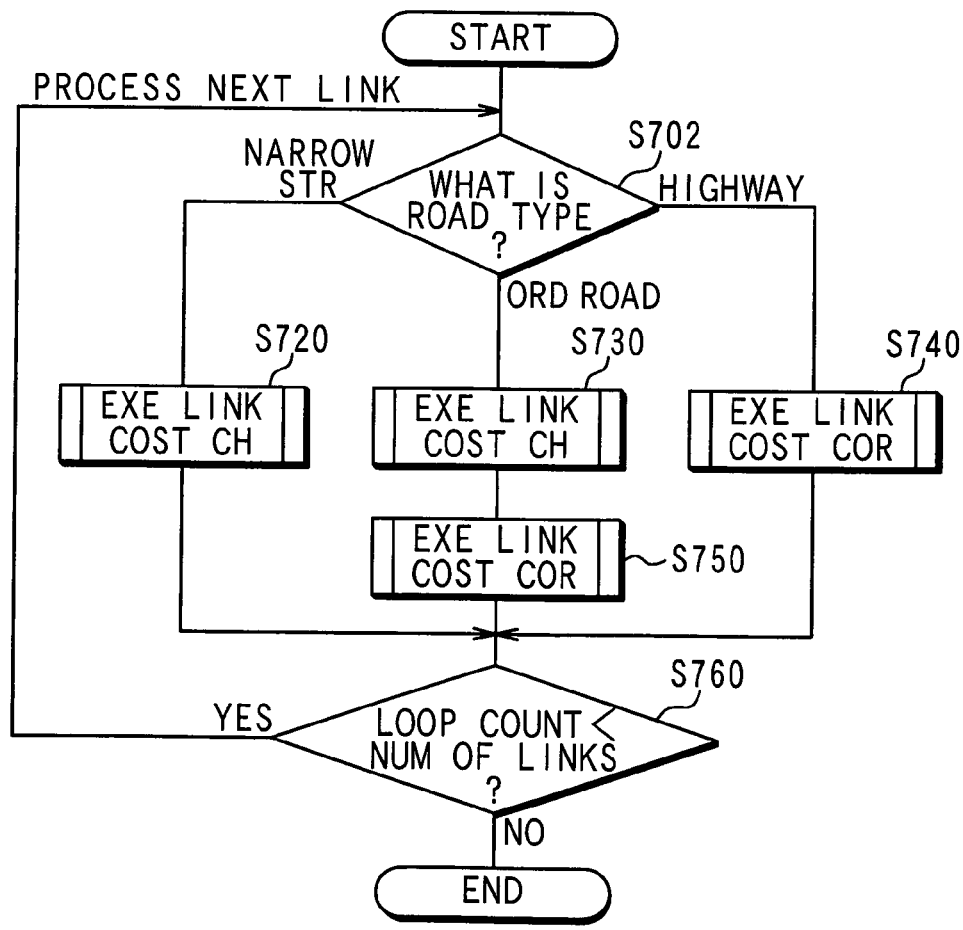
FIG. 6 is a diagram showing a flowchart of a driving repetition and traffic jam information utilization determination process.

FIG. 6 shows a flowchart of the driving repetition and traffic jam information utilization determination process. The device 1 repeats Steps S702 to S750 with respect to all links in the certain range having the route from the starting point to the destination.

First, in Step S702, the device 1 determines the type of a road in a link, which is processed. Specifically, the device 1 determines which type of a road the link as a process object is. The type of the road is, for example, a narrow street, an ordinary road or a highway.

When the link as the process object is the narrow street, it goes to Step S720. In Step S720, the device 1 executes a link cost change process. When the link is the ordinary road, the device 1 executes another link cost change process in Step S730 and a link cost correction process in Step S750. When the link is the highway, the device 1 executes another link cost correction process in Step S740.

Figure 7:
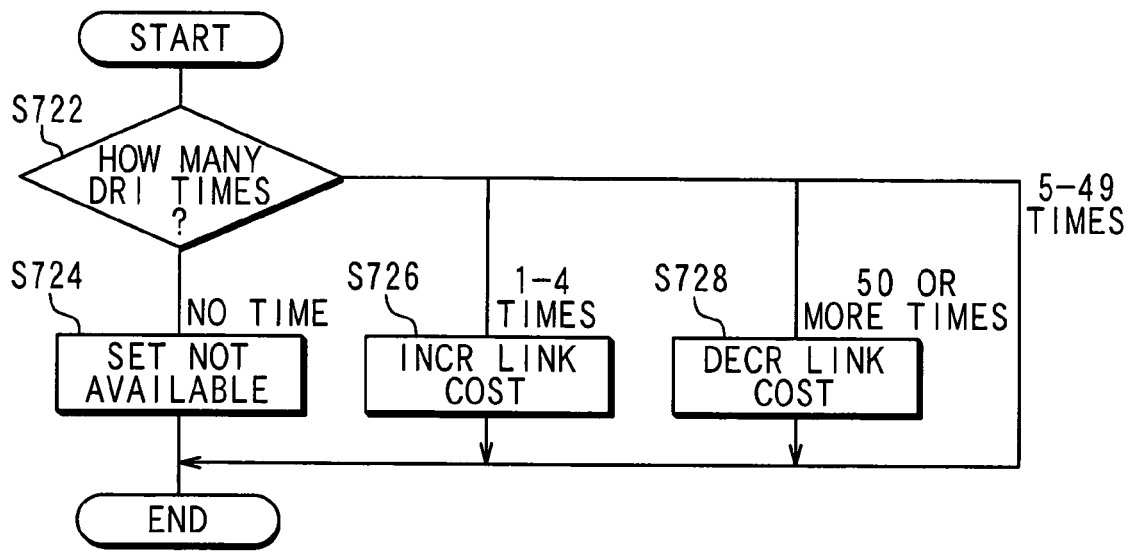
FIG. 7 is a diagram showing a flowchart of a link cost change process.
Figure 8:
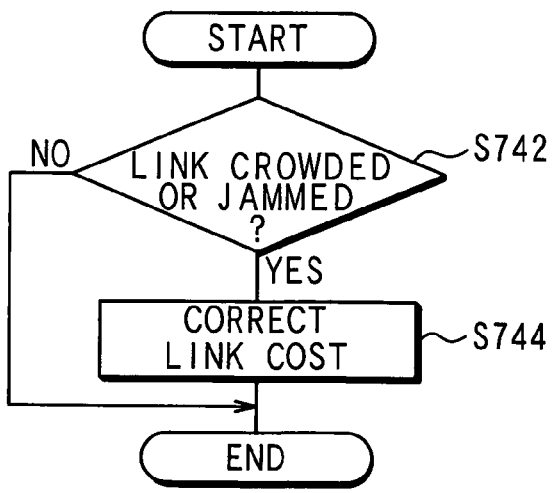
FIG. 8 is a diagram showing a flowchart of a link cost correction process.

FIG. 7 shows a flowchart of the link cost change process. FIG. 8 shows a flowchart of the link cost correction process.

In the link cost change process, the device 1 determines the number of driving times during a unit period of time in Step S722. Specifically, the device 1 determines whether the number of vehicles driving in each link during the last predetermined period of time is zero, in a range between once and four times, in a range between five times and forty-nine times, or equal to or more than fifty times. Here, the information about the number of vehicles is in the driving repetition information, which is received from the server 5. The number of vehicles represents a total number of vehicles.

When there is no vehicle, which passes the link during the predetermined period, i.e., when the total number of vehicles passing the link is zero, in Step S724, the device 1 sets the link, which is not available to pass. Specifically, in this case, the device 1 sets the link cost to be much larger so that the route does not include the link as the process object. In this embodiment, the link cost of the link as the process object is set to be the maximum value among the link cost.

When the total number of vehicles passing the link is in a range between one and four, in Step S726, the device 1 increases the link cost of the link as the process object. Specifically, the link cost is set to be larger. Thus, the link cost is changed.

When the total number of vehicles is equal to or larger than fifty, in Step S728, the device 1 decreases the link cost of the link as the process object. Specifically, the link cost is set to be smaller. Thus, the link cost is changed.

When the total number of vehicles is in a range between five and forty-nine, the link cost is not changed. Then, the process ends.

The above link cost change process provides to change the link cost of the link in accordance with the driving repetition, the link arranged in the certain area including the route from the starting point to the destination and corresponding to the narrow street or the ordinary road.

Next, FIG. 8 shows the link cost correction process. In this process, in Step S742, the device 1 determines based on the traffic jam information received from the server 5 whether the traffic of the link as the process object is jammed, crowded or smooth.

When the traffic of the link is jammed or crowded, the determination in Step S742 is "YES." Then, in Step S744, the link cost is corrected according to the traffic jam information. In this embodiment, the device 1 corrects the link cost by multiplying a predetermined factor by the link cost. Here, the factor is larger than one. Further, the factor corresponding to the jammed road is larger than the factor corresponding to the crowded road.

When the traffic of the link as the process object is not crowded and jammed, the determination in Step S742 is "NO." Then, the process ends without correcting the link cost.

The link cost correction process provides to correct the link cost based on the traffic jam information, the link disposed in the certain area including the route from the starting point to the destination and corresponding to the ordinary road and the highway.

After the link cost change process and/or the link cost correction process, Step S760 in FIG. 6 is executed. In Step S760, the server 5 determines whether the loop count is smaller than the number of links. Here, the loop count means the repeat count of Steps S702 to S750. When the loop count is smaller than the number of links, it goes to Step S702 so that the server 5 processes the next link.

When the loop count is equal to or larger than the number of links, the process ends. The above process is performed with respect to all driving link set, which is obtained from the in-vehicle device 1. When the process with respect to all driving link set ends, the driving repetition and traffic jam information utilization determination process ends.

After the driving repetition and traffic jam information utilization determination process in Step S700 with respect to all driving links in the certain area including the route from the starting point to the destination ends, in Step S410 in FIG. 4, an optimum route having the minimum total link cost is specified with using the link cost changed and/or corrected in the driving repetition and traffic jam information utilization determination process. Specifically, the total link cost of the links corresponding to the route from the starting point to the destination is minimized. Here, similar to Step S402, the total link cost is calculated by summing link costs of all links and node costs of all nodes.

Accordingly, the route is searched without including a section having no vehicle passing through each link in the section during the last predetermined period. Specifically, the route does not include the section providing zero total driving vehicle passing through each link in the section, and the information about the total driving vehicle is in the driving repetition information received from the server 5.

In the embodiment, the link cost is used as the total evaluation value, and the route is searched to minimize the total evaluation value of the route from the starting point to the destination. Alternatively, a parameter other than the link cost may be used as the total evaluation value, so that the route is searched to minimize the total evaluation value of the route from the starting point to the destination.

In the present embodiment, the server calculates the driving repetition in each section, which is preliminary determined, with using the traffic information received from the vehicles for collecting the traffic information. The device obtains the driving repetition information in each section from the server. Based on the driving repetition information, when the driving repetition in a section is smaller than a first threshold, for example, five times, the link cost corresponding to the section increases so that the evaluation value becomes large. With using the evaluation value, the route is searched to minimize the total evaluation value of the route from the starting point to the destination. Thus, the route is searched such that the route does not include a section, in which the vehicles cannot drive, and a section, in which the vehicle seldom drives.

Further, the link cost of the section, in which no vehicle drives for a predetermined period of time, is changed to be the maximum value. Thus, the route is searched not to include the section having no driving vehicle.

Furthermore, a second threshold is set to be larger than the first threshold. In this embodiment, the second threshold is set to fifty times. When the driving times in a section is equal to or larger than the second threshold, the link cost of the section is decreased so that the evaluation value becomes small. Accordingly, the route is searched to prioritize the section having the driving repetition equal to or larger than the second threshold.

Further, the evaluation value is corrected based on the traffic jam information such that the evaluation value of the section, which provides slow traffic flow, is set to be large. Thus, the route is searched to avoid the section having the slow traffic flow.

It is important to get information whether the vehicle can pass the narrow street or the ordinary road. In this embodiment, when the section is the narrow street or the ordinary road, the evaluation value of the section is changed according to the driving repetition information. Thus, the route is searched not to include the narrow street and the ordinary road, through which the vehicle cannot pass, or, seldom passes.

Regarding the ordinary road and the highway, it is important to get information about the traffic jam. In the above embodiment, when the section is the ordinary road or the highway, the evaluation value of the section is corrected based on the traffic jam information. Thus, the route is searched not to include the ordinary road or the highway, which is jammed or crowded.

In the above embodiment, when the traffic information obtained from the vehicles for collecting the traffic information regarding the driving road is received by the server, the server calculates the driving repetition, i.e., the driving number of times of vehicles in each section, the repetition which is determined based on the traffic information from the vehicles. The server stores the driving repetition information showing the driving number of times in each section in the database. In accordance with request from the route search device as the in-vehicle device of the vehicle, the sever extracts the driving repetition information in a specific section from the database. The server transmits the driving repetition information of the specified section to the route search device. The route search device changes the evaluation value as the link cost in a section to be larger when the driving repetition in the section is smaller than a threshold. With using the changed evaluation value, the device searches the route to minimize the total evaluation value of the route from the starting point to the destination.

Further, it is determined whether the traffic information received from the vehicle includes information about the section, which is one way. When the section is the one way, the driving repetition is calculated with specifying the driving direction. Thus, the route search device can search the route based on the driving repetition information with considering the one way traffic control.

In the above embodiment, the vehicle, on which the navigation device 1 is mounted, provides the probe vehicle for collecting the traffic information regarding the driving road by using the navigation device. Alternatively, the vehicle, on which the navigation device 1 is mounted, may be different from the probe vehicle.

Further, in the above embodiment, the total route cost is calculated by adding all link costs of the links and all node costs of the node. Alternatively, the total route cost may be calculated in a different manner.

In the above embodiment, in Step S702, the type of road corresponding to the processing link as the processing object is determined. Based on the type of road of the link, the link cost change process and/or the link cost correction process are executed, or not executed. Alternatively, the link cost change process and/or the link cost correction process may be executed without distinguishing the type of road of the link.

In the above embodiment, the driving repetition is defined as the driving number of times of the vehicles, which drive in each link while a predetermined period of time. When the driving repetition of a section is smaller than the first threshold, the evaluation value of the link is increased. Alternatively, the evaluation value may be changed according to the type of road.

In Step S724, when the driving number of times of the vehicles in a section during a predetermined period of time is zero, the link cost of the section is set to be the maximum value. Alternatively, the link cost may be set to be sufficient large so that the section corresponding to the link is not included in the searching route.

In Step S308, when the road corresponding to the link is not one way, the driving repetition is updated without distinguishing the driving direction. Alternatively, the driving repetition may be updated with distinguishing the driving direction even when the road corresponding to the link is not one way.

Steps S404 and S406 provide a driving repetition information obtaining element, Steps S408 and S720 provide an evaluation value changing element, Step S410 provides a route search element, Step S406 provides a traffic jam information obtaining element, Step S740 provides an evaluation value correction element, Step S702 provides a road type determination element, the database 52 provides a memory, Step S300 provides a driving repetition information memory, Steps S500, S600, S502, S504 provide a driving repetition information transmitting element, and Step S304 provides a one-way traffic control determination element.

The above disclosure has the following aspects.

According to a first aspect of the present disclosure, a route search device searches a route from a starting point to a destination, the route including a plurality of sections. The device includes: a parameter calculator for calculating a parameter of each section in the route based on road information in a map, data; a driving repetition information obtaining element for obtaining driving repetition information in each section from an external server, wherein the server calculates a driving repetition of vehicles in each section based on traffic information when the server receives the traffic information from vehicles for collecting the traffic information regarding a road; a parameter changing element for increasing a parameter of first one of the sections when the driving repetition of the first one of the sections is smaller than a first parameter threshold, wherein the driving repetition of the first one of the sections is determined based on the driving repetition information; and a route search element for searching the route to minimize a total of parameters of the sections in the route.

The above device can search the route without including a section, through which a vehicle cannot pass, and a section, through which the vehicle seldom passes.

Alternatively, the parameter changing element may increase the parameter of the first one of the sections to be maximum so that the route does not include the first one of the sections when no vehicle passes through the first one of the sections during a predetermined period of time. In this case, the device searches the route without including the first one of the sections, through which no vehicle passes.

Alternatively, the parameter changing element may decrease a parameter of second one of the sections when the driving repetition of the second one of the sections is equal to or larger than a second parameter threshold, and the second parameter threshold is larger than the first parameter threshold. In this case, the device searches the route such that the second one of the sections is prioritized.

Alternatively, the route search device may further include: a traffic jam information obtaining element for obtaining traffic jam information from the server; and a parameter correction element for increasing a parameter of third one of the sections when traffic flow in the third one of the sections is slower than a predetermined flow threshold. The traffic flow is determined based on the traffic jam information. In this case, the device searches the route with avoiding the section, of which the traffic flow is slow.

Alternatively, the route search device may further include: a road type determination element for determining a road type in each section. The parameter changing element increases the parameter of the first one of the sections when the road type of the first one of the sections is a narrow street or an ordinary road. In this case, the device searches the route without including the narrow street and the ordinary road, through which no vehicle passes or through which the vehicle seldom passes.

Alternatively, the route search device may further include: a road type determination element for determining a road type in each section. The parameter changing element increases the parameter of the third one of the sections when the road type of the third one of the sections is an ordinary road or a highway. In this case, the device searches the route without including the ordinary road and the highway, which are jammed or crowded.

Alternatively, the parameter in the section may be a cost including a link cost and a node cost. The link cost is calculated by adding the number of traffic signals in a link corresponding to the section and a product of a link length in the section, a road width factor and a road type factor, and the node cost is calculated by adding a product of a right turn factor and the number of right turns in the section and a product of a left turn factor and the number of left turns in the section. Further, the driving repetition of vehicles in each section may be a total number of vehicles, which passes through the section during a predetermined period of time. Furthermore, the route search device may further include: a map data memory medium for storing the map data. The route search device is a navigation device, and the traffic information includes average speed information, traveling time information, date information, position information, driving direction information and link set information.

According to a second aspect of the present disclosure, an information control server includes: a communication element for communicating a probe vehicle, which collects traffic information regarding a road; a driving repetition information memory for calculating a driving repetition in a predetermined section based on the traffic information when the server receives the traffic information from the probe vehicle, and for storing driving repetition information, which represents the driving repetition in the section; and a driving repetition information transmitting element for extracting the driving repetition of the section from the driving repetition information memory when a route search device in another vehicle requests the driving, repletion of the section, and for transmitting the driving repletion of the section to the route search device in the other vehicle.

The above server provides to increase a parameter for evaluating an optimum route when the driving repetition of the section is smaller than a predetermined value. Based on the parameter, the route is searched to minimize a total of parameters in the sections in the route.

Alternatively, the information control server may further include: a one-way traffic control determination element for determining whether the traffic information received from the probe vehicle includes one-way traffic control information. The driving repetition information memory calculates the driving repetition in the section with distinguishing a driving direction of the section when the section is one-way traffic. The route search device can search the route with considering the one-way traffic control information.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A route search device for searching a route from a starting point to a destination, wherein the route includes a plurality of sections, the device comprising:
   a parameter calculator for calculating a parameter of each section in the route based on road information in a map data;
   a driving repetition information obtaining element for obtaining driving repetition information in each section from an external server, wherein the server calculates a driving repetition of vehicles in each section based on traffic information when the server receives the traffic information from vehicles for collecting the traffic information regarding a road;
   a road type determination element for determining a road type in each section;
   a parameter changing element for increasing a parameter of first one of the sections when the driving repetition of the first one of the sections is smaller than a first parameter threshold, and the road type of the first one of the sections is a narrow street or an ordinary road, wherein the driving repetition of the first one of the sections is determined based on the driving repetition information; and
   a route search element for searching the route to minimize a total of parameters of the sections in the route,
   wherein the parameter changing element maintains the parameter of first one of the sections when the road type of the first one of the sections is a highway.

2. The route search device according to claim 1,
   wherein the parameter changing element increases the parameter of the first one of the sections to be maximum so that the route does not include the first one of the sections when no vehicle passes through the first one of the sections during a predetermined period of time.

3. The route search device according to claim 1,
   wherein the parameter changing element decreases a parameter of second one of the sections when the driving repetition of the second one of the sections is equal to or larger than a second parameter threshold, and
   wherein the second parameter threshold is larger than the first parameter threshold.

4. The route search device according to claim 1, further comprising:
   a traffic jam information obtaining element for obtaining traffic jam information from the server; and
   a parameter correction element for increasing a parameter of third one of the sections when traffic flow in the third one of the sections is slower than a predetermined flow threshold,
   wherein the traffic flow is determined based on the traffic jam information.

5. The route search device according to claim 1,
   wherein the parameter in the section is a cost including a link cost and a node cost,
   wherein the link cost is calculated by adding the number of traffic signals in a link corresponding to the section and a product of a link length in the section, a road width factor and a road type factor, and
   wherein the node cost is calculated by adding a product of a right turn factor and the number of right turns in the section and a product of a left turn factor and the number of left turns in the section.

6. The route search device according to claim 5,
wherein the driving repetition of vehicles in each section is a total number of vehicles, which passes through the section during a predetermined period of time.

7. The route search device according to claim 6, further comprising:
a map data memory medium for storing the map data,
wherein the route search device is a navigation device, and
wherein the traffic information includes average speed information, traveling time information, date information, position information, driving direction information and link set information.

8. A route search device for searching a route from a starting point to a destination, wherein the route includes a plurality of sections, the device comprising:
a parameter calculator for calculating a parameter of each section in the route based on road information in a map data;
a driving repetition information obtaining element for obtaining driving repetition information in each section from an external server, wherein the server calculates a driving repetition of vehicles in each section based on traffic information when the server receives the traffic information from vehicles for collecting the traffic information regarding a road;
a parameter changing element for increasing a parameter of first one of the sections when the driving repetition of the first one of the sections is smaller than a first parameter threshold, wherein the driving repetition of the first one of the sections is determined based on the driving repetition information; and
a route search element for searching the route to minimize a total of parameters of the sections in the route,
wherein, when the driving repetition of vehicles of second one of the sections is zero, the route search element set the second one of the sections not to be available to pass.

9. The route search device according to claim 1, wherein the parameter calculator, the driving repetition information obtaining element, the road type determination element, the parameter changing element, and the route search element are all located on a vehicle.

* * * * *